US012296471B2

(12) United States Patent
Sharifi et al.

(10) Patent No.: US 12,296,471 B2
(45) Date of Patent: May 13, 2025

(54) SELECTIVE INTERACTION OF ROBOTIC DEVICE WITH ADDITIONAL COMPUTING DEVICE(S)

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 604 days.

(21) Appl. No.: 17/544,117

(22) Filed: Dec. 7, 2021

(65) Prior Publication Data

US 2023/0173657 A1  Jun. 8, 2023

Related U.S. Application Data

(60) Provisional application No. 63/286,298, filed on Dec. 6, 2021.

(51) Int. Cl.
*B25J 9/00* (2006.01)
*G05D 1/00* (2006.01)
(Continued)

(52) U.S. Cl.
CPC .......... *B25J 9/0003* (2013.01); *G05D 1/0088* (2013.01); *G05D 1/12* (2013.01);
(Continued)

(58) Field of Classification Search
CPC ..... B25J 9/0003; G06V 20/50; G05D 1/0088; G05D 1/12; G06F 3/165; G06F 3/167; G01L 15/22; H04R 1/323
(Continued)

(56) References Cited

U.S. PATENT DOCUMENTS 10,366,692 B1   7/2019  Adams
10,913,146 B1 * 2/2021  Bareddy ................ B25J 9/1682
(Continued)

OTHER PUBLICATIONS

Piller, M. "The Next Generation Transcripts—Ensign Ro"; retrieved from the internet: URL:http://www.chakoteya.net/NextGen/203.htm; 12 pages; dated Oct. 7, 1991.
(Continued)

*Primary Examiner* — Mahmoud S Ismail
(74) *Attorney, Agent, or Firm* — Gray Ice Higdon

(57) ABSTRACT

Implementations set forth herein relate to a robotic computing device that can seek additional information from other nearby device(s) for fulfilling a request and/or delegating certain operations to the other nearby device(s). Delegating certain operations can involve the robotic computing device maneuvering to a location of a nearby device and soliciting the nearby device for assistance by providing an input from the robotic computing device to the nearby device. In some instances, the input can include an audible rendering of an invocation phrase and a command phrase for invoking an automated assistant that is accessible via the nearby device. A determination of whether to delegate certain operations or seek additional information can be based on a variety of factors such as predicted efficiency and estimated accuracy of performance for performing certain operations.

17 Claims, 8 Drawing Sheets

(51) Int. Cl.
  *G06F 3/16*    (2006.01)
  *G06V 20/50*   (2022.01)
  *G10L 15/22*   (2006.01)
  *H04R 1/32*    (2006.01)

(52) U.S. Cl.
  CPC ............ *G06F 3/165* (2013.01); *G06F 3/167* (2013.01); *G06V 20/50* (2022.01); *G10L 15/22* (2013.01); *H04R 1/323* (2013.01)

(58) Field of Classification Search
  USPC .......................................................... 701/23
  See application file for complete search history.

(56) References Cited

U.S. PATENT DOCUMENTS

| | | | |
|---|---|---|---|
| 2018/0079081 A1* | 3/2018 | Chen | B25J 9/0003 |
| 2019/0030719 A1* | 1/2019 | Dey | B25J 9/1682 |
| 2019/0126467 A1* | 5/2019 | Kawamoto | B25J 9/0003 |
| 2020/0278667 A1* | 9/2020 | Voorhies | B25J 9/1697 |
| 2020/0282549 A1* | 9/2020 | Torii | B25J 9/1661 |

OTHER PUBLICATIONS

Roddenberry, G. "The Next Generation Transcripts—Brothers'"; retrieved from the internet: URL:http://www.chakoteya.net/NextGen/177.htm; 12 pages; dated Oct. 4, 1990.

European Patent Office; International Search Report and Written Opinion issued in Application No. PCT/US2022/046060; 13 pages; dated Jan. 24, 2023.

\* cited by examiner

SELECTIVE INTERACTION OF ROBOTIC DEVICE WITH ADDITIONAL COMPUTING DEVICE(S)

BACKGROUND

Automated assistants have been widely adopted in many homes to facilitate hands-free access to information from the internet, and control over other peripheral devices inside and outside of a home. Oftentimes, assistant-enabled devices are static devices that may not have functionality for driving to different locations within a home. As a result, operations performed by automated assistants may be geographically limited according to where a user may have placed their assistant-enabled devices during installation. Although this may not be particularly inefficient for executing certain tasks, such as when a user issues an internet search query (e.g., "Who is Joseph Fourier?"), other tasks that involve communicating between users and/or rendering an output to a user who is in motion may prove inefficient or ineffective when executed by a static device or network of static devices. For example, a user that is listening to audio from a phone call rendered by a kitchen assistant device may not be able to hear the audio when the user moves from a kitchen to a hallway that has no assistant-enabled device. As a result, the user may have to ask for another person on the phone call to repeat what they said, and/or pause the call when the user needs to leave the room, thereby wasting time and computational resources.

In some instances, an assistant-enabled device may be able to answer a query from a user by causing a separate assistant-enabled device to render an output that is responsive to the query. However, attempts to delegate the execution of certain operations in this way may not be effective in multi-assistant environments, in which multiple assistant devices are associated with different software providers and/or user accounts. As a result, a less suitable assistant device may be tasked with executing certain operations—even though other, more suitable, devices may be available (e.g., devices with better sound quality, stronger signal, more efficient power utilization, etc.). For example, a task of communicating between users can be executed, by default, by an assistant device that received a corresponding request from a user. However, when other, more suitable, devices are available for fulfilling such a request and/or the default devices are not positioned to effectively communicate with any of the identified users, resources can be further wasted when an ability of devices to interact is lacking.

SUMMARY

Implementations set forth herein relate to a robotic computing device that can interact with other nearby devices—optionally using techniques common to human users—to facilitate fulfillment of a request from a user to the robotic computing device. The robotic computing device can, for example, render an audible command to a nearby assistant-enabled device to fulfill a request submitted to the robotic computing device from a user. For example, a user can provide a spoken utterance to a robotic computing device such as, "Can you help Emma find her car toy?", which can be a request for the robotic computing device to identify a particular object in a home of the user. In response to receiving the spoken utterance, the robotic computing device can determine that searching information stored at the robotic computing device to identify a suitable description of the "car toy" may not result in an accurate description. For instance, the robotic computing device can have internet search capabilities, but search results for the phrase "Emma's car toy" or "car toy" may not provide any accurate description of the object that the user is referring to. Therefore, the robotic computing device can, with prior or current permission from the user, instead generate an output command to be provided to one or more other computing devices within the home of the user to retrieve more accurate details about the object that the user is referring to.

In some implementations, the robotic computing device can generate natural language content such as, "Assistant, what is 'Emma's car toy?'", and can thereafter render the natural language content as an audible output to a nearby computing device. In response, the nearby computing device (e.g., a different assistant-enabled device) can cause an image of "Emma's car toy" to be rendered at a display panel. One or more camera images of the displayed image can be captured, with prior permission from the user, by a camera of the robotic computing device, and the robotic computing device can utilize these camera images to estimate a probable location of "Emma's car toy." For instance, the prior images captured by the robotic computing device, and associated with locations on a home graph, can be processed to determine whether an object in the camera image is captured in any of the prior images. When a particular prior image is determined to include the object (e.g., "Emma's car toy"), a map location stored in association with the particular prior image can be identified and utilized by the robotic computing device. The robotic computing device can then navigate from a current location of the robotic computing device (e.g., a location where the robotic computing device issued the audible output to the nearby device) to the map location corresponding to the object in the particular camera image. Alternatively, or additionally, the robotic computing device can generate additional natural language content that characterizes the map location, and render another output that characterizes the additional natural language content for the user (e.g., an audible output or display output that says "The car toy is under the kitchen table.").

In some implementations, the robotic computing device can determine whether to delegate actions to other nearby devices, and perform such delegation using one or more techniques similar to human-to-computer interactions. In other words, when the robotic computing device determines that another computing device may be more suitable for performing a requested action, the robotic computing device can issue, to the other computing device, a command that may also be discernible by a human. For example, a user can provide a spoken utterance to a robotic computing device such as, "Play some music while I cook." In response, the robotic computing device can determine that a plugged-in device may be more suitable for fulfilling this request—at least in part because the robotic computing device may be operating using battery power. Based on this determination, the robotic computing device can identify a nearby device that is capable of more efficiently fulfilling the request from the user.

For instance, the robotic computing device can identify a kitchen smart display (i.e., a standalone display device) that is within a threshold distance from the user for rendering audio content. In some implementations, the robotic computing device can identify a device name, or a type of the kitchen smart display, and render a command for the robotic computing device based on the name or type of the kitchen smart display. For example, based on identifying the type of nearby device, the robotic computing device can identify an invocation phrase (e.g., "Ok Smart Device . . . ") for that particular type of device. Using this invocation phrase, and with prior permission from the user, the robotic computing device can render an audible output such as, "Ok Smart Device, play some music while I am cooking." In response, the kitchen smart display can begin rendering music. In this way, the robotic computing device can operate as an interface between the user and all of their smart devices—even though the kitchen smart display is not specifically preconfigured to be delegated tasks from the robotic computing device. When the delegation of tasks is performed based on performance and/or efficiency, smart devices within the home of the user can preserve resources such as bandwidth and power at the direction of the robotic computing device.

In some implementations, the robotic computing device can leverage the functionality of other devices when the robotic computing device determines that another device can complete a requested task sooner than the robotic computing device. Such instances can occur when a standalone device and/or other robotic computing device are determined to be closer to a task location than the robotic computing device that initially received a request to complete the requested task. For example, a user ("Kaiser") can provide a spoken utterance such as, "Tell Karma to turn off the heater upstairs" to a robotic computing device. The robotic computing device can be located on a first floor of a home of the user, with a standalone computing device, and another standalone computing device can be located on a second floor of the home near another user ("Karma"). In response to receiving the spoken utterance from the user, the robotic computing device can determine, with prior permission from person(s) in the home, that the other user is located on a different floor of the home than the robotic computing device. Based on this determination, the robotic computing device can cause the other standalone computing device on the second floor to broadcast a message to the other user.

In some implementations, the robotic computing device can cause the other standalone computing device to broadcast the message in a variety of different ways. For example, the robotic computing device can communicate with the standalone computing device on the first floor to cause the other standalone computing device on the second floor to broadcast the message (e.g., "Kaiser would like you to turn off the heater."). Communication between the robotic computing device and the standalone computing device can occur over a local area network (LAN), wide area network (WAN) such as the Internet, audible or inaudible frequency, Bluetooth communication, and/or any other medium for communicating between devices. For instance, the robotic computing device can generate natural language content corresponding to a command to be provided to the standalone speaker device on the first floor. The natural language content can be embodied in an audible or inaudible message (e.g., "Ok smart device, broadcast a message telling Karma to turn off the heater upstairs.") to the standalone speaker device. In response, the other standalone computing device on the second floor can render an audible output and/or visual message such as "Turn off the heater upstairs." Providing a robotic computing device that can interface with other computers within a home of the user can allow for more efficient utilization of resources within the home, while also minimizing completion times for requested tasks.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
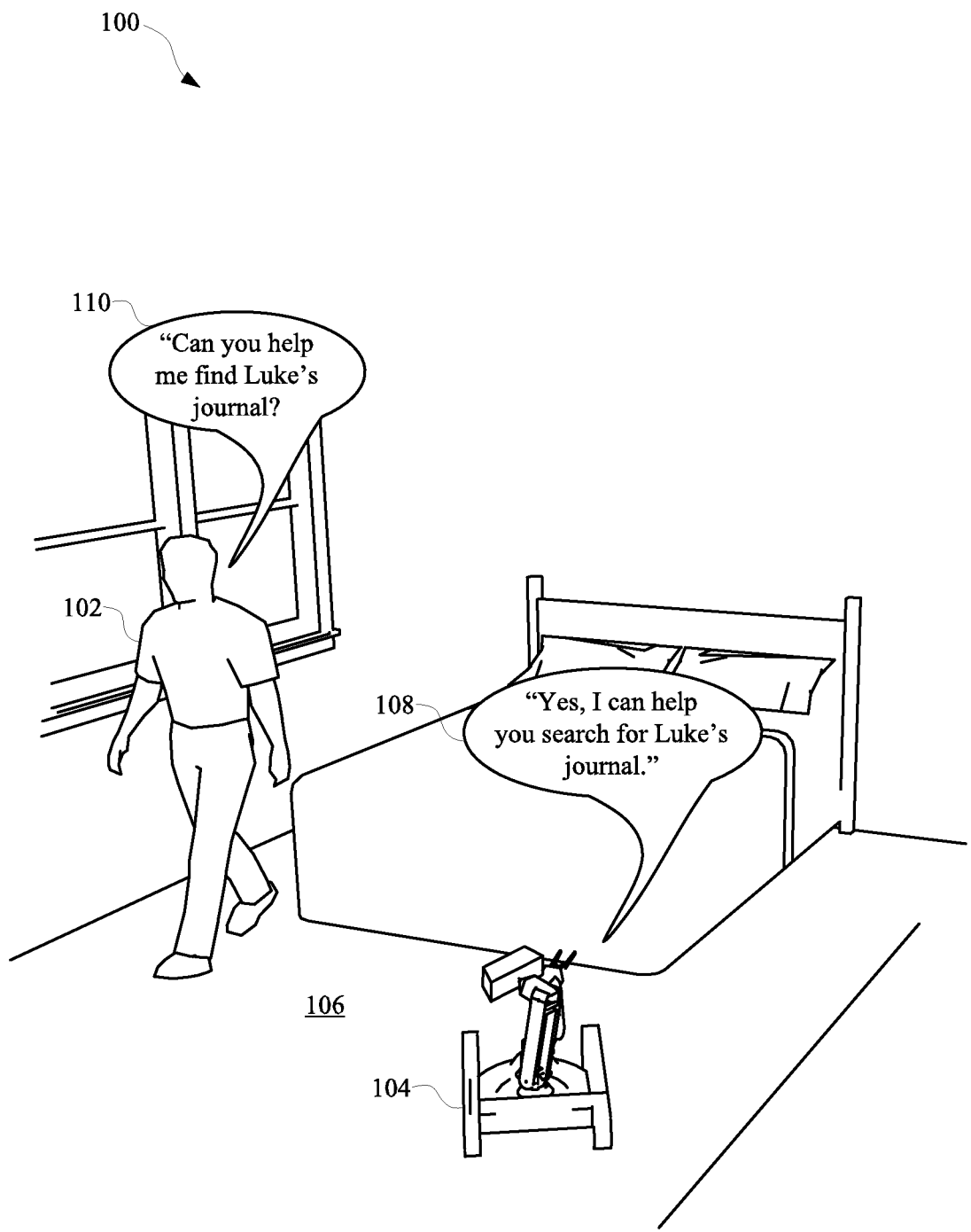
FIG. 1A, FIG. 1B, FIG. 1C, FIG. 1D, and FIG. 1E illustrate views of a robotic computing device operating to assist a user by employing the assistance of other nearby computing devices.

FIG. 1A, FIG. 1B, FIG. 1C, FIG. 1D, and FIG. 1E illustrate a view 100, a view 120, a view 140, a view 160, and a view 180 of a robotic computing device 104 operating to assist a user 102 by employing the assistance of other nearby computing devices. The robotic computing device 104 can determine whether to seek the assistance of an additional computing device based on a variety of different factors such as a degree of confidence that the robotic computing device 104 can accurately fulfill a request from a user, an amount of energy expected to be consumed at one or more devices, a duration of time for fulfilling the request at one or more devices, an amount of processing bandwidth consumed at one or more devices, and/or any other factors that can be considered when delegating a task to and/or from a particular device. For example, the robotic computing device 104 and the user 102 can be located in an environment 106 (e.g., a home of the user 102) when the user 102 provides a spoken utterance 110 such as, "Can you help me find Luke's journal?" In response to the spoken utterance 110, the robotic computing device 104 can provide a responsive output 108 such as, "Yes, I can help you search for Luke's journal."

In some implementations, and in response to receiving the spoken utterance 110, the robotic computing device 104 can process audio data corresponding to the spoken utterance 110 to identify one or more operations to perform in response to the spoken utterance 110. For example, the robotic computing device 104 can determine that the user 102 is requesting assistance with determining a location of an object within the environment 106. In some implementations, this request can be fulfilled by at least executing an intent with slot values associated with the object to be identified. For example, a slot value for the intent can include an image of the object. However, although the robotic computing device 104 may have access to multiple images that may be similar to and/or associated with the object, the robotic computing device 104 can determine that the multiple images are not relevant to a threshold degree of confidence. As a result, the robotic computing device 104 can determine whether to delegate the fulfillment of the request to another device and/or seek additional information from another device and/or user within the environment 106 (or outside of the environment 106).

For example, in response to determining that the robotic computing device 104 may not be able to fulfill the request with a threshold degree of confidence, the robotic computing device 104 can determine whether another device is available for assisting with fulfilling the request. For instance, the robotic computing device 104 can determine, using sensor data and/or other data available to the robotic computing device 104, that the environment 106 includes one or more other devices that can be invoked for providing additional information. In some implementations, such data can include image data and/or audio data captured by the robotic computing device 104 with prior permission from users in the household. For instance, images captured by the robotic computing device 104 can be processed to determine whether the environment 106 includes one or more other computing devices and/or a type for one or more other computing devices within the environment 106. When the robotic computing device 104 determines that a smart display device 124 and/or smart speaker device 122 ("smart" can indicate that the device has an ability to access the internet and respond to user inputs), the robotic computing device 104 can determine whether the identified devices require an invocation phrase to be invoked. For example, the robotic computing device 104 can perform an internet search and/or other database search to determine how to solicit a particular device for additional information.

Figure 1B:
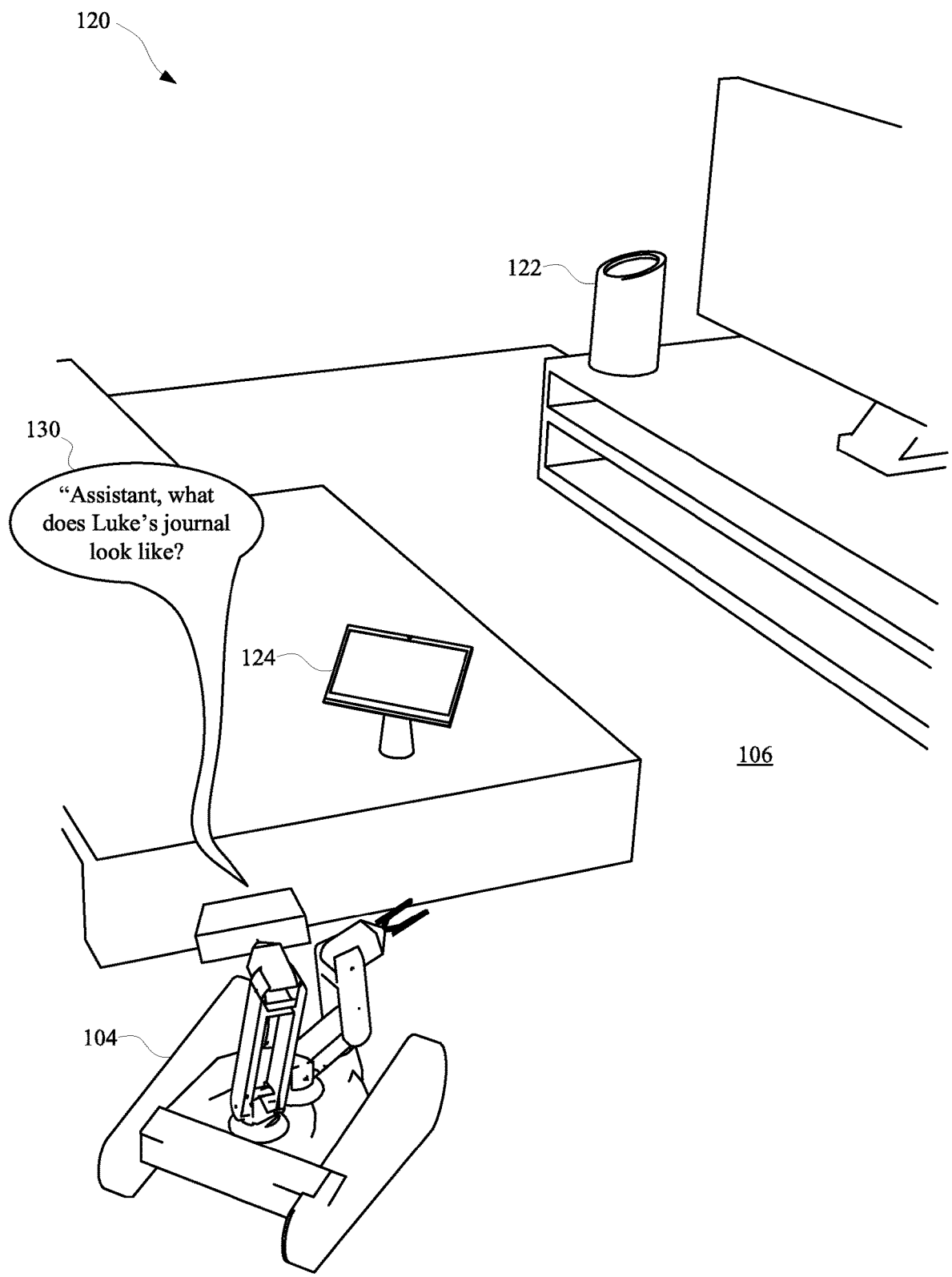

As illustrated in view 120 of FIG. 1B, the robotic computing device 104 can navigate to an area of the environment 106 that includes the smart display device 124 and solicit the smart display device 124 for additional information using a determined invocation phrase. Additionally, the robotic computing device 104 can generate content of a robotic input to be provided by the robotic computing device 104 to the smart display device 124. The content can be generated using one or more heuristic processes and/or one or more trained machine learning models (e.g., a language model). For example, because the robotic computing device 104 may not have a threshold degree of confidence in what a particular object looks like, the robotic computing device 104 can generate content that embodies a request for a description of features of the particular object. In accordance with the aforementioned example, the robotic computing device 104 can render an audio output 130 that includes content such as, "Assistant, . . . " which can refer to the invocation phrase, and " . . . what does Luke's journal look like?", which can refer to a command for soliciting additional information from the smart display device 124.

Figure 1C:
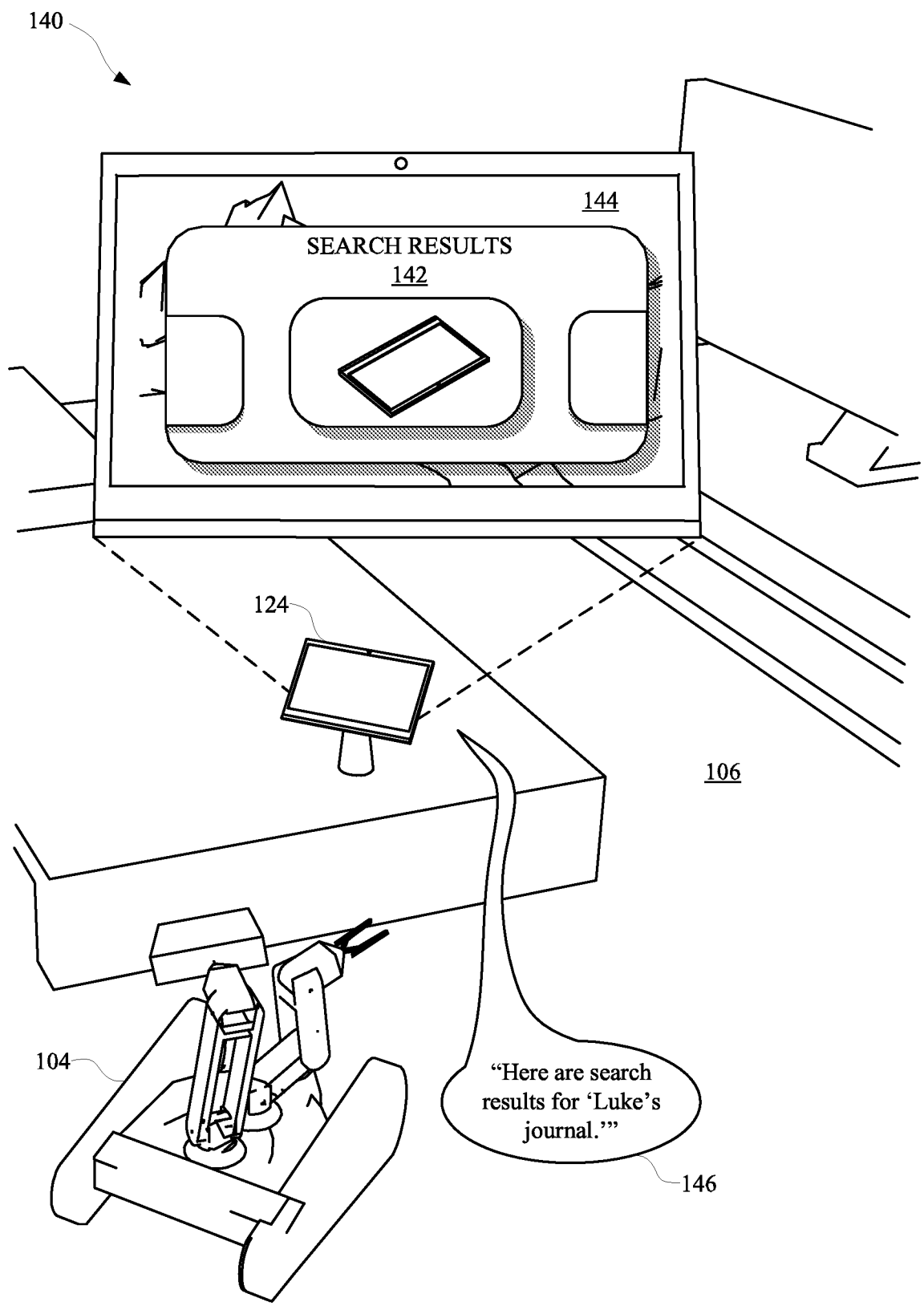

In response to the audio output 130, the smart display device 124 can render search results 142 at a display interface 144 of the smart display device 124, as illustrated in view 140 of FIG. 1C. Alternatively, or additionally, the smart display device 124 can provide an audible response 146 such as, "Here are search results for 'Luke's journal'" and thereafter provide an audible description of features of the object referred to by the robotic computing device 104. In some implementations, when the smart display device 124 is rendering the search results 142 and/or audible descriptions of the object, the robotic computing device 104 can capture data based on output being rendered by the smart display device 124. For instance, the robotic computing device 104 can use one or more cameras 166 and/or one or more microphones to capture the output being rendered by the smart display device 124. The smart display device 124 can capture an image of the search results 142, which can include an image of a journal that one or more users may have recently searched the internet for. The image can be utilized by the robotic computing device 104 to fulfill the request from the user 102.

In some implementations, data captured by the robotic computing device 104 can be compared, with prior permission from the user(s), to private home knowledge graph data and/or public home knowledge graph data for determining a location of the object referred to by the user 102. Values stored in a knowledge graph can include textual values (e.g., names of objects, names of places, other textual descriptors of entities), numerical values (e.g., type of entity, usage data, age, height, weight, other feature data, other numerical information associated with entities), or pointers to values specific to a user (e.g., a location in memory to an entity in a knowledge graph of a user, a location in memory that correlates two or more entities in the knowledge graph of a user, etc.). In other words, a value specific to a user and/or environment (e.g., a particular home) may take many forms and be specific to a field of a personal record that is defined by a recording schema. The value may indicate the actual information that is specific to the user or may be a reference to a memory location and/or device from which the information specific to the user and/or environment can be retrieved.

In some instances, a comparison between data presented by the smart display device 124 and data graphed in a personal knowledge graph and/or home knowledge graph can result in identification of information that can assist the robotic computing device 104 with fulfilling the request from the user 102. For example, the robotic computing device 104 can determine the location of the identified object based on a similar object being captured and location data stored in the home knowledge graph for the user 102. When location is identified, the robotic computing device 104 can optionally determine whether the location has been determined with a threshold degree of certainty or confidence. When the robotic computing device 104 determines with a threshold degree of confidence that the object identified by the user (e.g., Luke's journal) is at the location, the robotic computing device 104 can render an indication for the user 102.

Figure 1D:
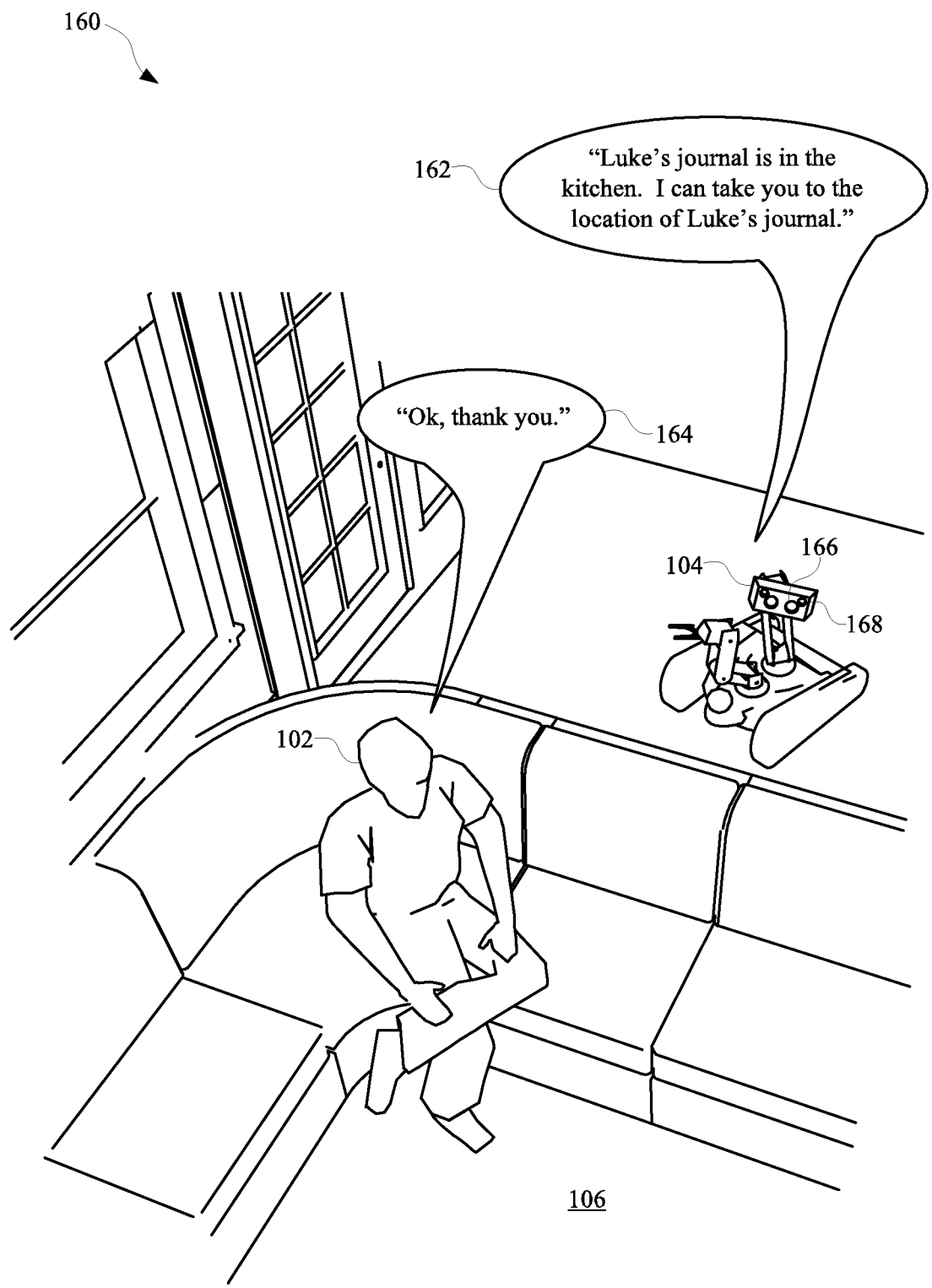
Figure 1E:
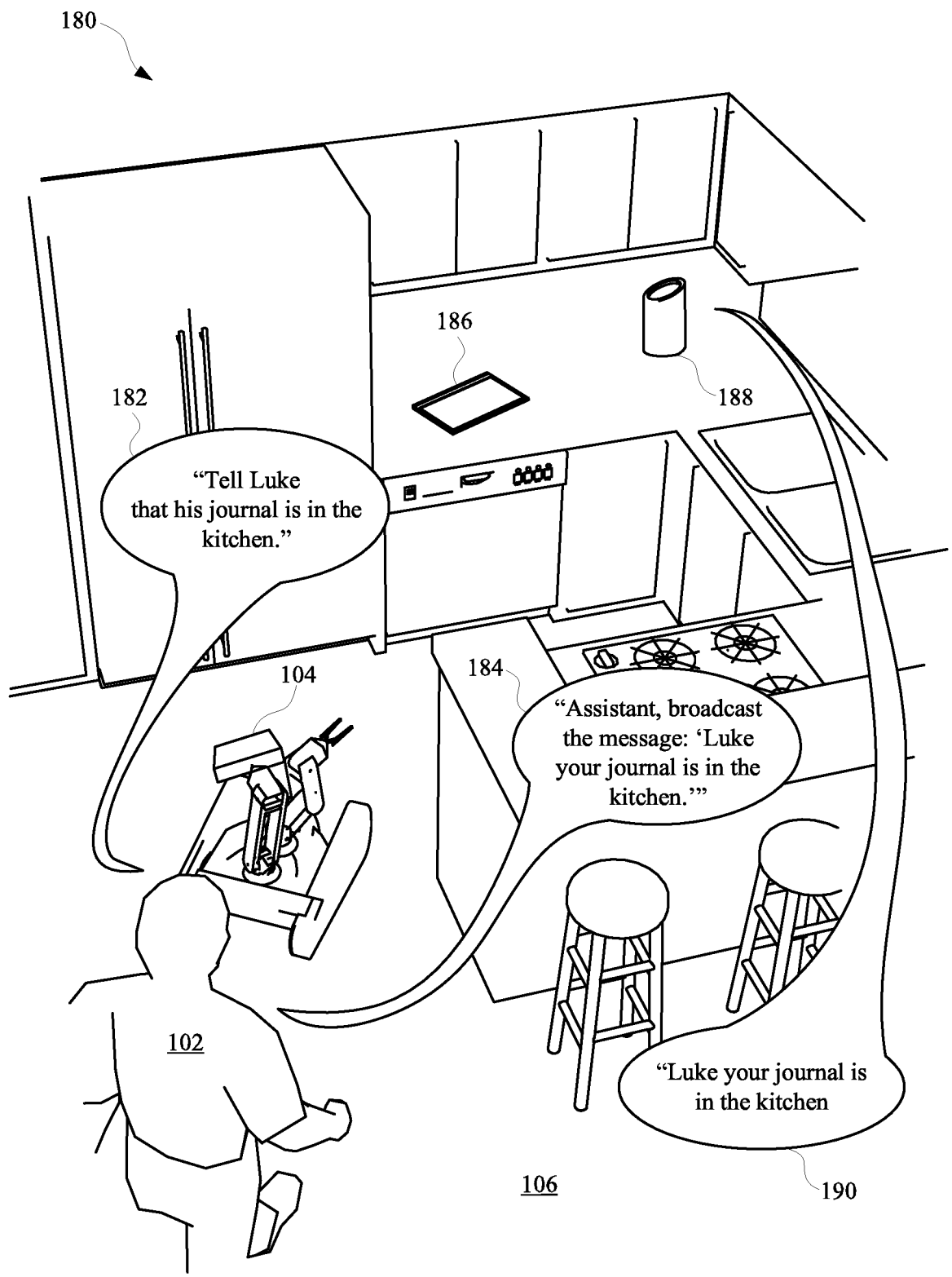

For example, and as illustrated in view 160 of FIG. 1D, the robotic computing device 104 can navigate from an area in the environment 106 from where the user 102 solicited the robotic computing device 104 for help, to a separate area. The separate area can be a location predicted by the robotic computing device 104, with prior permission from the user 102, to be where the user 102 has relocated. Depending on the output to be rendered for the user 102, the robotic computing device 104 can navigate to the location of the user 102 and/or solicit another computing device to render the output to the user 102. For example, when the user 102 is predicted to be in a location that is proximate to another device, the robotic computing device 104 can communicate with the other computing device (e.g., via a Wi-Fi network) to cause the other computing device to render the output for the user 102. Otherwise, the robotic computing device 104 can navigate to a proximate location of the user 102 to render an audible output 162 and/or visual output. For example, when the robotic computing device 104 determines information for fulfilling the request from the user 102, the robotic computing device 104 can render an audible output 1062 such as, "Luke's journal is in the kitchen. I can take you to the location of Luke's journal." In response, the user 102 can provide a positive affirmation 164, such as "Ok, thank you," to confirm that the user 102 is willing to be led to the location of the specified object.

In response to the user 102 confirming the offer from the robotic computing device 104 to be directed to the object, the robotic computing device 104 can maneuver to a different area in the environment 106. This different area can be, for example, a kitchen that includes a counter upon which the desired object is residing. In some instances, the user 102 can issue another request to the robotic computing device 104, as illustrated in view 180 of FIG. 1E. The other request can be, for example, a spoken utterance 182 such as, "Tell Luke that his journal is in the kitchen." This request can be a solicitation from the user 102 for the robotic computing device 104 to communicate a message to another user. In some implementations, the robotic computing device 104 can process this input from the user 102 and determine whether or not to delegate fulfillment of the request. For example, using home knowledge graph data and/or other data, the robotic computing device 104 can determine whether or not one or more other devices would be able to more effectively fulfill the request from the user 102.

In some instances, the robotic computing device 104 can determine, with prior permission from user(s), a predicted location of the user, Luke, to estimate whether the robotic computing device 104 could effectively communicate with Luke, or whether another device could more effectively communicate with Luke. For example, the robotic computing device 104 can determine, based on personal knowledge graph data, that the user Luke is in their room playing on their cellular phone, and that a smart speaker device is located in their room. Based on this determination, the robotic computing device 104 can determine that the robotic computing device 104 would consume more energy and/or take more time to communicate with Luke without assistance from another device. Therefore, the robotic computing device 104 can determine that a smart speaker device 188 is nearby and, based on the type of smart device, can be invoked to broadcast a message to the user, Luke. For example, the robotic computing device 104 can generate content for an audible output such as, "Assistant, tell Luke that his journal is in the kitchen." This audible output can cause the smart speaker device 188 and/or one or more other computing devices to render an output 190 such as, "Luke your journal is in the kitchen."

In some implementations, the robotic computing device 104 can confirm with the smart speaker device 188, smart display device 124, and/or other computing device that an object 186 (e.g., Luke's journal) identified by the robotic computing device 104 is the object that the user 102 was intending to locate. For example, the robotic computing device 104 can identify the object 186, maneuver an arm or other portion of the robotic computing device 104 to pick up the object 186, and carry the object 186 to a location of the smart display device 124 or smart speaker device 188 (e.g., when the smart speaker device 188 includes a camera). The robotic computing device 104 can then solicit the smart display device 124 (or other device) to confirm whether the object 186 is the object that the user 102 is referring to.

For example, the robotic computing device 104 can generate a command that includes an invocation phrase and content for requesting that the smart display device 124 to capture an image of what the robotic computing device 104 holding. For instance, the command can be, "Smart Device, is this Luke's journal?" In some implementations, this command can be generated based on prior interactions between the user 102 and the smart display device 124 that put the robotic computing device 104 on notice of the capabilities of the smart display device 124. Alternatively, or additionally, this command can be generated based on a search of a database, internet, or other source of information for determining types of commands that the smart display device 124 is responsive to.

In some implementations, the robotic computing device 104 can confirm with the user 102 or another user that the object 186 identified by the robotic computing device 104 is the object that the user 102 is referring to. For example, the robotic computing device 104 can initialize soliciting another user (e.g., Luke) to confirm the name for the object 186 by providing a command to the smart display device 124 to perform a video call with the robotic computing device 104. For example, the robotic computing device 124 can generate a command such as, "Smart Device, call Luke on a video call," and render the command as an audio output to the smart display device 124. In response, the smart display device 124 can initialize a video call between the robotic computing device 124 and the other user (with prior permission from the other user). In some instances, the other user may not be in the environment 106 but the robotic computing device 104 can nonetheless initialize communication with the other user via a separate computing device in the environment 106. When the video call is initialized at the smart display device 124, the robotic computing device 104 can hold up the object 186 and ask the other user to confirm the name for the object 186 (e.g., "Hi Luke, is this your journal?"). In response, should the other user confirm the name for the object 186, the robotic computing device 104 can consider the request from the user 102 to be fulfilled.

Figure 2:
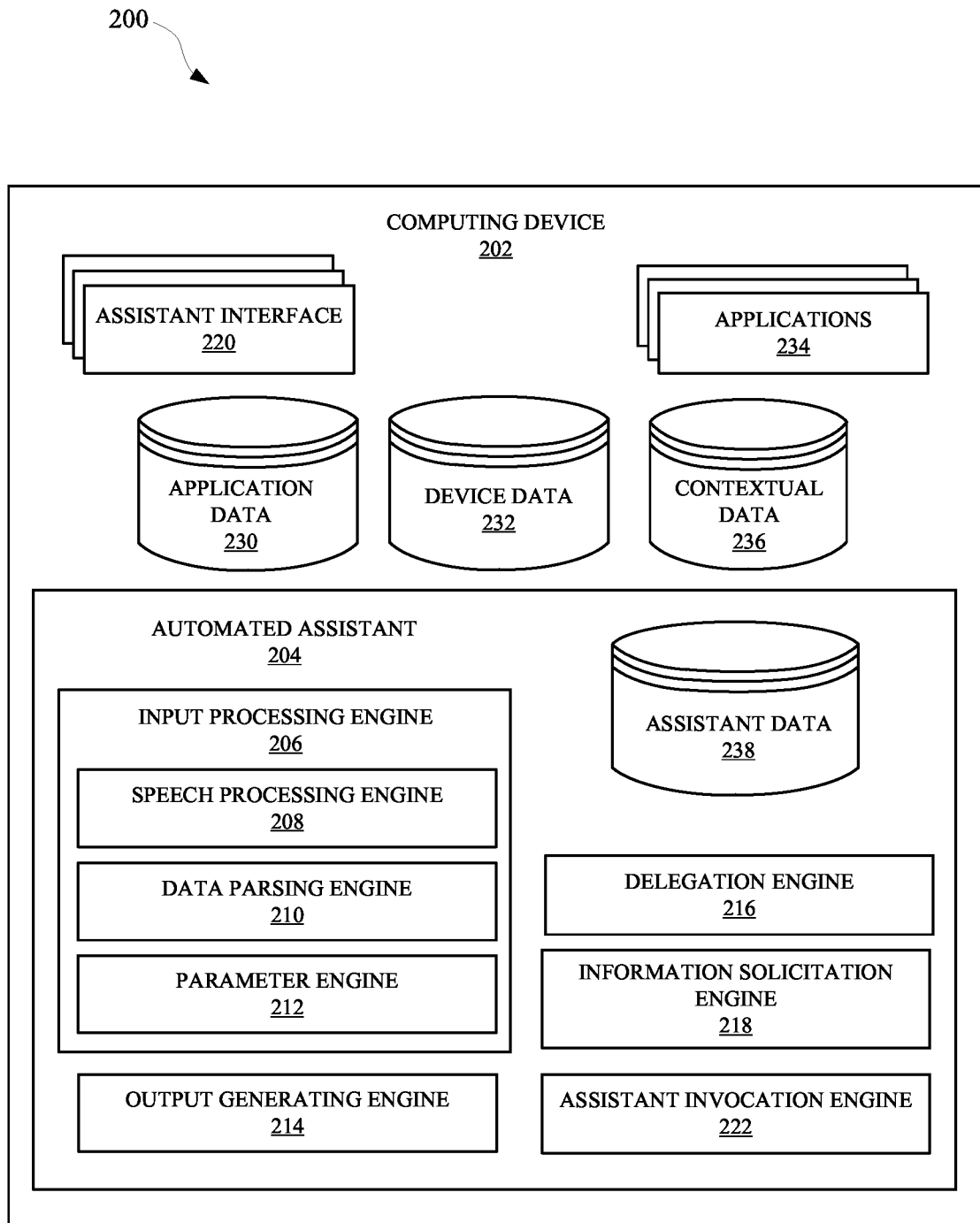
FIG. 2 illustrates a system for operating a robotic computing device that can seek additional information from other nearby devices for fulfilling a request and/or delegating certain tasks to the other nearby devices.

FIG. 2 illustrates a system 200 for operating a robotic computing device (e.g., computing device 202) that can seek additional information from other nearby devices for fulfilling a request and/or delegating certain tasks to the other nearby devices. The robotic computing device can include an automated assistant 204 that can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the assistant invocation engine 222 can process data in furtherance of determining how to invoke a nearby device that provides access to an instance of the automated assistant 204 and/or a different assistant application. For example, image data captured at a camera of the computing device 202 can be processed to determine a type of computing device that is co-located in an environment with the computing device 202. The computing device 202 can then determine that this type of computing device provides access to a certain automated assistant that can be invoked using a particular invocation phrase. Based on this determination, the computing device 202 can initialize the output generating engine 214 to render the invocation phrase when the computing device 202 determines to seek additional information from a nearby device and/or delegate a task to the nearby device. The output generating engine 214 can then render an output (e.g., an audible output, Bluetooth command, inaudible request, etc.) that includes the invocation phrase and content of a request generated by the computing device 202.

In some implementations, the system 200 can include a delegation engine 216 that can determine whether to delegate fulfillment of requests and/or portions of a request to another computing device. In some implementations, the delegation engine 216 can process data to determine, with prior permission from a user, states of devices and/or applications associated with the user and capable of being delegated certain tasks. Data processed by the delegation engine 216 can be selected according to the request provided by a user, thereby allowing the computing device 202 to customize the delegation of certain tasks on a per-request basis. For example, data that indicates whether certain interfaces of a device are being utilized when the delegation engine 216 is determining whether to delegate a task of rendering music for a user. Alternatively, or additionally, the delegation engine 216 can process power utilization data when determining whether to delegate a variety of different types of requests, to identify the nearby devices that are plugged into a utility power source or utilizing a battery power source. In this way, the computing device 202 can avoid delegating certain tasks to nearby devices that may not have an optimal power source for completing the tasks.

In some implementations, the delegation engine 216 can access personal knowledge graph data and/or home graph data for one or more different users (with prior permission from the users) to make decisions regarding delegating certain tasks for fulfilling a request. For example, home graph data can indicate, with prior permission from a user, a location of certain objects and/or features within a home of the user, a status of certain devices (e.g., processing bandwidth, signal strength, battery charge), and/or any other property of a device or object. Alternatively, or additionally, the home graph data can indicate a status of certain devices and/or applications that are being accessed within the home. Personal knowledge graph data can also be utilized by the delegation engine 216 to determine whether or not to delegate certain tasks to certain devices. For instance, the personal knowledge graph data can indicate preferences of the user for having certain operations be performed by certain devices, and/or any other preferences that can be stored by a device. The computing device 202 can use this data to delegate tasks that the user may prefer to have executed at a different device—despite having provided a corresponding request to the computing device 202.

In some implementations, home graph data and/or personal knowledge graph data can be updated using data generated by the robotic computing device. For example, image data and/or audio data captured by the robotic computing device, with prior permission from the user, as the robotic computing device maneuvers through an environment can be utilized to update home graph data and/or personal knowledge graph data. In some implementations, the robotic computing device can proactively generate such data when certain portions of home graph data and/or personal knowledge graph data have not been updated for at least a threshold duration of time. Alternatively, or additionally, the data regarding certain objects and/or certain portions of an environment can be updated when the robotic computing device has not observed the objects and/or the portions of the environment for at least a threshold duration of time.

In some implementations, the computing device 202 can include an information solicitation engine 218 that can process data to determine whether to seek additional information for fulfilling a request from a user. The additional information can be solicited from another device and/or application when the information solicitation engine 218 determines that a particular request cannot be fulfilled with a threshold degree of confidence, at least without soliciting additional information. In some implementations, determining whether to solicit additional information and/or delegate certain tasks can be based on one or more heuristic processes and/or one or more trained machine learning models. For example, when a user provides a request to the computing device 202, the delegation engine 216 and/or the information solicitation engine 218 can generate a confidence metric that can indicate whether a task for fulfilling the request should be delegated and/or whether additional information should be sought.

For example, an input that embodies a request can be processed to determine a confidence metric for fulfilling the request. Alternatively, or additionally, a candidate response can be generated by the computing device 202 and processed to determine a confidence metric for the candidate response. When either of the confidence metrics do not satisfy the confidence metric for delegating tasks, the delegation engine 216 can initialize a process of determining a suitable device to delegate a task to. When either of the confidence metrics do not satisfy the confidence metric for soliciting additional information, the information solicitation engine 218 can initialize a process of determining a suitable device to solicit additional information from. In some implementations, the information solicitation engine 218 can initially determine whether additional information should be solicited for a particular request and, thereafter, the delegation engine 216 can determine whether one or more tasks for a request should be delegated to another device. For example, the computing device 202 can receive a request to broadcast a message to another and, initially, the information solicitation engine 218 can determine with a threshold degree of confidence that no additional information should be solicited for fulfilling the request. Thereafter, or simultaneously, the delegation engine 216 can determine that a particular computing device is more suitable for performing a task of broadcasting the message. The delegation engine 216 can then generate data to be utilized by the assistant invocation engine 222 to output a request from the computing device 202 to the particular computing device to cause the particular computing device to fulfill the request (e.g., broadcast the message).

Figure 3:
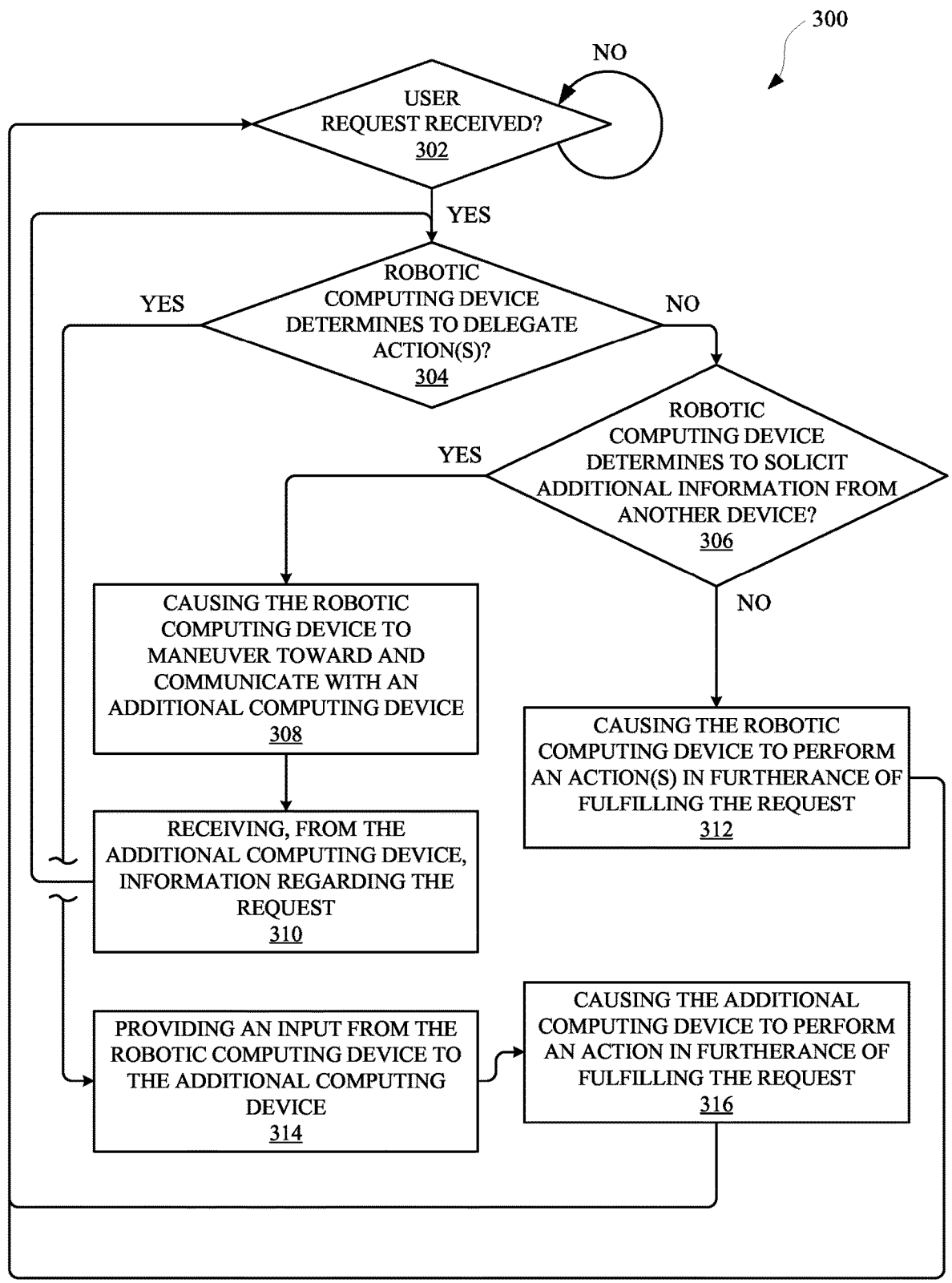
FIG. 3 illustrates a method for controlling a robotic computing device to fulfill requests from a user by delegating performance to, and/or gathering additional information from, one or more other computing devices.

FIG. 3 illustrates a method 300 for controlling a robotic computing device to fulfill requests from a user by delegating performance to, and/or gathering additional information from, one or more other computing devices. The method 300 can be performed by one or more computing devices, applications, and/or any other apparatus or module that can be associated with an automated assistant. The method 300 can include an operation 302 of determining whether a user input has been received by the robotic computing device. The user input can be, for example, a request for the robotic computing device to provide a location of an object within a home of the user. For example, the user can provide a spoken utterance such as, "Where is Maggie's drone?", which can refer to a toy drone that is owned by another user that is in an environment (e.g., a home) with the user. The user can provide the spoken utterance to the robotic computing device in furtherance of recruiting the robotic computing device for assisting the user and the other user with finding the object (e.g., "Maggie's drone").

The method 300 can proceed from the operation 302 to an operation 304, which can include determining whether the robotic computing device should delegate fulfillment of the request to an additional device in the environment. In some instances, the environment can be a home of the user, and can include multiple different devices that provide access to one or more different automated assistant applications. For example, the environment can include an office with a first assistant device and a kitchen with a second assistant device. When the robotic computing device receives the user input, the robotic computing device can process the user input and determine that the user is requesting that a location of an object be identified by the robotic computing device. Based on this determination, the robotic computing device can estimate a location for the object and a degree of confidence metric for the estimation of the location.

In some implementations, the estimation of location can be based on a search of images performed in response to receiving the user input from the user. One or more image results identified from the image search can be compared to one or more images captured by the robotic computing device, with prior permission from the user, as the robotic computing device maneuvers around the environment. The robotic computing device, and/or another device (e.g., a server device) can determine whether the object identified by the user corresponds to an item identified in the captured images with a threshold degree of confidence. For instance, a confidence metric can be generated based on a comparison between the image search result(s) and the captured image(s) to quantify a degree of confidence for identifying a particular object. When the degree of confidence does not satisfy a particular threshold degree of confidence, the robotic computing device can determine to seek additional information regarding the particular object requested to be identified. However, when the degree of confidence does satisfy the particular threshold degree, the robotic computing device may perform the requested action of identifying the particular object, or delegate the task to another device.

In some implementations, delegation of an action can be based on a variety of different factors such as whether delegating an action will result in less power consumption, less restriction of network and/or processing bandwidth at a device, faster completion of the action, and/or any other factor that can be suitable to consider when delegating actions among devices. For example, the robotic computing device can determine that an additional device (e.g., a different robotic device, or other smart device) is more proximate to the predicted location of the object. Based on this determination, the robotic computing device can determine that delegating the action of confirming the location of the object will result in less energy consumption—at least compared to the robotic computing device performing the action.

When the robotic computing device determines to delegate the one or more actions based on one or more different factors, the method 300 can proceed from the operation 304 to an operation 314. The operation 314 can include providing, by the robotic computing device, an input from the robotic computing device, to an additional computing device. In accordance with the aforementioned example, the input can be a communication (e.g., audio, visual, wireless, Bluetooth, etc.) between the robotic computing device and another computing device. The content of the communication can embody a request for the other computing device to maneuver to the location of the object (e.g., Maggie's drone) and/or otherwise confirm the location of the object. The method 300 can proceed from the operation 314, to an operation 316, which can include causing the additional computing device to perform an action in furtherance of fulfilling the request.

For example, when the robotic computing device determines, with a threshold degree of confidence, that the object can be located by the robot computing device, the robotic computing device can communicate with the additional computing device to identify the location of the object. The communication from the robotic computing device can be an audible communication, visual communication, wireless communication, and/or any other communication that can be provided between devices. In some implementations, the robotic computing device can provide an audio output at a frequency that is above or below a frequency that is detectable by a natural human. Alternatively, or additionally, the communication from the robotic computing device can be provided to the additional computing device as a communication via a wireless communication protocol (e.g., Bluetooth, Wi-Fi, LTE, and/or any other communication protocol). The communication can be processed by the additional computing device, thereby resulting in the additional computing device searching for the location of the object in accordance with one or more different processes. For instance, the additional computing device can be a separate robotic computing device that can navigate through a different area of the environment than the robotic computing device in response to receiving the communication from the robotic computing device. When the additional computing device identifies the location of the object, the additional computing device can communicate the location of the object to the robotic computing device.

When the robotic computing device determines to not delegate the action to another computing device at the operation 304, the method 300 can proceed from the operation 304 to an operation 306. The operation 306 can include determining whether to solicit additional information from another computing device and/or another user (with prior permission from the other user). In some implementations, the determination can be based on whether the degree of confidence satisfies the threshold degree of confidence and/ or one or more other thresholds. For instance, when the degree of confidence metric does not satisfy another confidence metric, the robotic computing device can determine to solicit information from an additional computing device (e.g., from the operation 306 to an operation 308). Alternatively, or additionally, the robotic computing device can rely on one or more heuristic processes and/or one or more trained machine learning models for determining whether to solicit additional information. For example, an input from a user can be processed using one or more trained machine learning models to generate an embedding that can be compared to existing embeddings mapped in a latent space. When an embedding distance, between the generated embedding and the existing embedding, satisfies a threshold, the method 300 can proceed from the operation 306 to an operation 312.

The operation 312 can include causing the robotic computing device to perform one or more actions (i.e., operations) in furtherance of fulfilling the request. For example, in accordance with the aforementioned example, the robotic computing device can identify the location of the object with the threshold degree of confidence, and indicate the location to the user. In some implementations, the robotic computing device can indicate the location by providing an audible and/or visual output at one or more interfaces of the robotic computing device and/or another computing device. Alternatively, or additionally, the robotic computing device can indicate the location of the object by offering to maneuver to the location of the object (e.g., "Ok, I can take you to Maggie's toy."), and thereafter maneuver to the location of the object.

When the robotic computing device determines to solicit additional information from another computing device, the method 300 can proceed from the operation 306 to the operation 308, which can include causing the robotic computing device to maneuver toward and communicate with an additional computing device. For example, the additional computing device can be a standalone computing device, such as a display device or a speaker device. The robotic computing device can select the additional computing device for communicating with based on a determination that the user has previously interacted with the additional computing device. For instance, and with prior permission from the user, the robotic computing device can identify one or more devices that the user has previously interacted with, and determine whether the one or more devices provide access to an automated assistant. When the robotic computing device determines that a particular additional device provides access to an automated assistant, the robotic computing device can initialize communications with the automated assistant. For example, the robotic computing device can determine the type of automated assistant that is accessible via the additional computing device and, based on the type of automated assistant, determine an invocation phrase for communicating with the automated assistant. For instance, the robotic computing device can employ an application programming interface (API), and/or perform an internet search, for identifying the invocation phrase for the additional computing device.

When the invocation phrase is identified, the robotic computing device can generate natural language content that includes the invocation phrase and a particular request for the automated assistant. The invocation phrase can be, for example, "Assistant . . . " and the particular request can be, for example, "What does Maggie's drone look like?" Content of the particular request can be based on a feature of the user input that the robotic computing device may be uncertain about. The feature that is identified as a basis for retrieving additional information can be selected based on one or more parameters and/or slot values of an action that is to be executed by the robotic computing device in furtherance of fulfilling the request from the user. For instance, a particular slot value can be based on an identifier for an object to be located. Therefore, in order to generate the identifier, the robotic computing device can solicit the additional computing device for additional information regarding the object to be located. The method 300 can then proceed from the operation 308 to an operation 310.

The operation 310 can include receiving, from the additional computing device, information regarding the request. The additional information can be communicated via the same modality that the robotic computing device communicated with the additional computing device. Alternatively, or additionally, the additional computing device can communicate with the robotic computing device via a different modality than the modality that the robotic computing device communicated with the additional computing device. For instance, the robotic computing device can communicate a solicitation for the additional information via an audio output to the additional computing device. In some implementations, the audio output from the robotic computing device can be provided to the additional computing device via beamforming and/or otherwise selectively directing the audio output and/or other output at the particular additional computing device. In some implementations, the audio output of the robotic computing device can be rendered, with prior permission from the user, to embody a voice that is acceptable to a speaker identification ("ID") process utilized by the additional computing device. The voice can be selected by the user and/or can be based on a prior interaction between the robotic computing device and the additional computing device. In some implementations, the technique for beamforming output can be performed using one or more microphones and/or antennas that can detect the output being provided by the robotic computing device. Based on a relative amplitude and/or phase of signals detected at each respective microphone and/or antenna, each individual output interface (e.g., a speaker, transmitter, etc.) can be adjusted such that constructive interference can facilitate transmission to the additional computing device. In some implementations, this beamforming technique can be utilized in response to the robotic computing device determining to delegate a task (i.e., an action) to another computing device, and/or seek additional information from another computing device.

In response to the audio output from the robotic computing device, the additional computing device can render an image at a display panel of the additional computing device. The robotic computing device can then capture an image of the display panel and/or download the image via a wireless communication protocol (e.g., Bluetooth, Wi-Fi, etc.). Thereafter, and based on the additional information provided by the additional computing device, the method 300 can proceed from the operation 310 and return to the operation 304 for determining whether to delegate an action to another device, execute the action, and/or solicit further information from another device.

Figure 4:
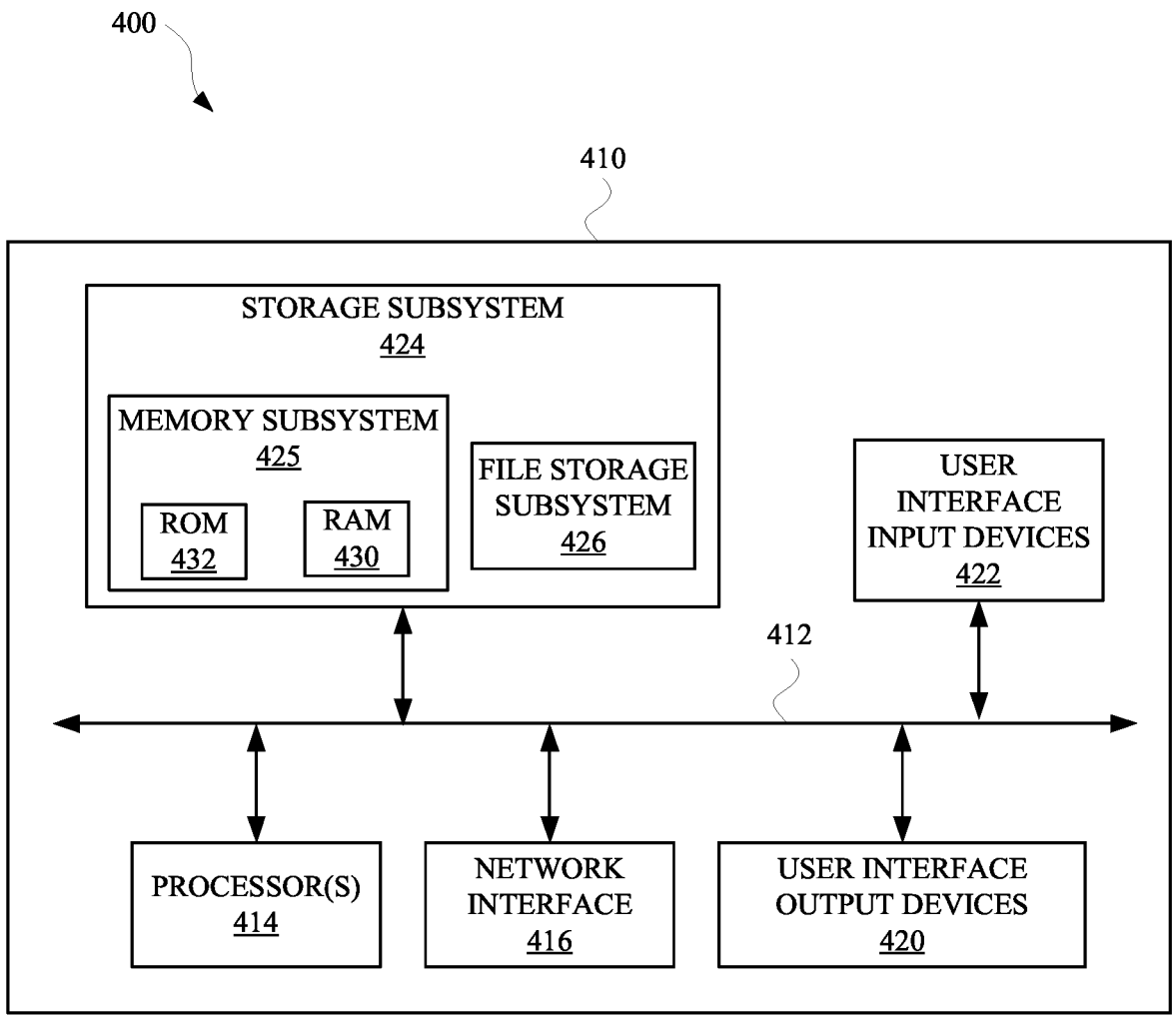
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of robotic computing device 104, system 200, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes receiving, at a robotic computing device, a user input that solicits the robotic computing device to identify a location of a particular object within an environment of a user and the robotic computing device. The method can further include determining, in response to the user input, whether the robotic computing device can identify the location of the particular object within the environment with a threshold degree of confidence. The method can further include, when the robotic computing device cannot, with the threshold degree of confidence, identify the location of the particular object in the environment, causing, based on the robotic computing device not identifying the location with the threshold degree of confidence, the robotic computing device to maneuver within the environment toward a different location that is more proximate to an additional computing device. The method can further include causing, by the robotic computing device, a robotic input to be generated by the robotic computing device and provided by the robotic computing device as input to the additional computing device, wherein the robotic input includes content that solicits the additional computing device for information associated with the particular object. The method can further include receiving, by the robotic computing device and from the other computing device in response to the robotic input, a responsive output that characterizes particular information associated with the particular object. The method can further include causing, based on the particular information, the robotic computing device to identify, for the user, the location of the particular object within the environment.

These and other implementations of the technology disclosed herein can optionally include one or more of the following features.

In some implementations, causing the robotic computing device to identify the location of the particular object includes: causing the robotic computing device to maneuver to a separate location within the environment, in furtherance of identifying the location of the particular object.

In some implementations, receiving the responsive output from the additional computing device includes: capturing an image of a display panel of the additional computing device, where, when the image is captured, the display panel is rendering the particular information for the robotic computing device.

In some implementations, determining whether the robotic computing device can identify the location of the particular object within the environment with the threshold degree of confidence includes: processing home graph data that characterizes locations of various features of the environment occupied by the user and the robotic computing device, and generating a confidence metric that characterizes a probability that a particular feature of the various features of the environment corresponds to the particular object. The confidence metric is compared to the threshold degree of confidence.

In some implementations, the method can further include, when the robotic computing device can, with the threshold degree of confidence, identify the location of the particular object within the environment: causing the robotic computing device to identify the location of the particular object within the environment.

In some implementations, a method implemented by one or more processors is provided and includes receiving, at a robotic computing device, a user input that embodies a request for the robotic computing device to facilitate performance of an operation. The robotic computing device occupies an environment with the user and one or more other computing devices. The method can further include determining, in response to the user input, whether an additional computing device of the one or more other computing devices is exhibiting a state that is more suitable, relative to a current state of the robotic computing device, for initializing performance of the operation. The method can further include, when the additional computing device of the one or more other computing devices is determined to exhibit the state that is more suitable for initializing performance of the operation, causing, by the robotic computing device, a robotic input to be generated by the robotic computing device and provided as input to the additional computing device. The robotic input includes content that solicits the additional computing device to initialize performance of the operation. Providing the robotic input causes the additional computing device to initialize performance of the operation based on the robotic input.

These and other implementations of the technology disclosed herein can optionally include one or more of the following features.

In some implementations, the additional computing device of the other computing device(s) is determined to exhibit the state that is more suitable for initializing performance of the operation based on (a) the additional computing device being plugged into a utility power source, and (b) the current state of the robotic computing device being a battery powered state.

In some implementations, the additional computing device of the other computing device(s) is determined to exhibit the state that is more suitable for initializing performance of the operation based on the additional computing device exhibiting a greater signal strength than a signal strength exhibited by the robotic computing device in the current state.

In some implementations, the additional computing device of the other computing device(s) is determined to exhibit the state that is more suitable for initializing performance of the operation based on the additional computing device exhibiting a greater processing bandwidth than a processing bandwidth exhibited by the robotic computing device in the current state.

In some implementations, when the additional computing device is determined to not exhibit the state that is more suitable for initializing performance of the operation, the method further includes causing the robotic computing device to initialize performance of the operation.

In some implementations, causing the robotic input to be generated by the robotic computing device and provided as input to the additional computing device includes: causing the robotic computing device to render an audio output via an audio interface of the robotic computing device.

In some implementations, causing the robotic input to be generated by the robotic computing device and provided as input to the additional computing device includes: determining a location of the additional computing device, and causing the robotic computing device to render the audio output toward the location of the additional computing device. In some versions of those implementations, causing the robotic computing device to render the audio output via the audio interface of the robotic computing device comprises: repositioning the robot and/or one or more components of the robot such that one or more speakers of the robot, that emit the audio output, are facing a direction that is toward the location of the additional computing device. Optionally, causing the robotic computing device to render the audio output via the audio interface of the robotic computing device includes rendering the audio output at a frequency that is above an audible frequency range of a human.

In some implementations, a method implemented by one or more processors is provided and includes receiving, at a robotic computing device, a user input that embodies a request for the robotic computing device to facilitate performance of an operation. The robotic computing device occupies an environment with a user and one or more other computing devices. The method can further include determining, in response to the user input, whether an additional computing device of the one or more other computing device could more effectively perform the operation than the robotic computing device because of a location of the additional computing device. The method can further include, when the robotic computing device determines that the additional computing device can more effectively perform the operation because of the location of the additional computing device: providing a robotic input from the robotic computing device to the additional computing device in furtherance of causing the additional computing device to perform the operation. The robotic input causes the additional computing device to initialize performance of the operation and fulfill the request embodied in the user input.

These and other implementations of the technology disclosed herein can optionally include one or more of the following features.

In some implementations, determining whether the additional computing device could more effectively perform the operation than the robotic computing device because of the location of the additional computing device includes: determining that the location of the additional computing device is closer to a particular area of the environment than the robotic computing device.

In some implementations, determining whether the additional computing device could more effectively perform the operation than the robotic computing device because of the location of the additional computing device includes: determining that the location of the additional computing device is closer to an additional user in the environment than the robotic computing device. In those implementations, fulfilling the request involves communicating with the additional user.

In some implementations, providing the robotic input from the robotic computing device to the additional computing device in furtherance of causing the additional computing device to perform the operation includes: rendering, at the robotic computing device, an audible output that embodies natural language content that directs the additional computing device to perform the operation. In some versions of those implementations, the additional computing device provides access to an automated assistant, and the natural language content includes an invocation phrase that invokes the automated assistant. In some additional or alternative versions of those implementations, the operation involves broadcasting a message to an additional user, and the natural language content characterizes the message to be broadcast by the additional computing device for the additional user.

We claim:

1. A method implemented by one or more processors, the method comprising:
   receiving, at a robotic computing device, a user input that embodies a request for the robotic computing device to facilitate performance of an operation,
      wherein the robotic computing device occupies an environment with the user and one or more other computing devices;
   determining, in response to the user input, whether an additional computing device of the one or more other computing devices is exhibiting a state that is more suitable, relative to a current state of the robotic computing device,
for initializing performance of the operation; and
   when the additional computing device of the one or more other computing devices is determined to exhibit the state that is more suitable for initializing performance of the operation:
      causing, by the robotic computing device, a robotic input to be generated by the robotic computing device and provided as input to the additional computing device,
         wherein the robotic input includes content that solicits the additional computing device to initialize performance of the operation,
         wherein providing input to the additional computing device includes causing the robotic computing device to render an audio output via an audio interface of the robotic computing device, and
         wherein providing the robotic input causes the additional computing device to initialize performance of the operation based on the robotic input.

2. The method of claim 1, wherein the additional computing device of the one or more other computing devices is determined to exhibit the state that is more suitable for initializing performance of the operation based on the additional computing device being plugged into a utility power source, and the current state of the robotic computing device being a battery powered state.

3. The method of claim 1, wherein the additional computing device of the one or more other computing devices is determined to exhibit the state that is more suitable for initializing performance of the operation based on the additional computing device exhibiting a greater signal strength than a signal strength exhibited by the robotic computing device in the current state.

4. The method of claim 1, wherein the additional computing device of the one or more other computing devices is determined to exhibit the state that is more suitable for initializing performance of the operation based on the additional computing device exhibiting a greater processing bandwidth than a processing bandwidth exhibited by the robotic computing device in the current state.

5. The method of claim 1, further comprising:
when the additional computing device of the one or more other computing devices is determined to not exhibit the state that is more suitable for initializing performance of the operation:
causing the robotic computing device to initialize performance of the operation.

6. The method of claim 1, wherein causing the robotic input to be generated by the robotic computing device and provided as input to the additional computing device includes:
determining a location of the additional computing device,
wherein the robotic computing device renders the audio output toward the location of the additional computing device.

7. The method of claim 6, wherein causing the robotic computing device to render the audio output via the audio interface of the robotic computing device includes rendering the audio output at a frequency that is above an audible frequency range of a human.

8. The method of claim 6, wherein causing the robotic computing device to render the audio output via the audio interface of the robotic computing device comprises:
repositioning the robot and/or one or more components of the robot such that one or more speakers of the robot, that emit the audio output, are facing a direction that is toward the location of the additional computing device.

9. A method implemented by one or more processors, the method comprising:
receiving, at a robotic computing device, a user input that embodies a request for the robotic computing device to facilitate performance of an operation,
wherein the robotic computing device occupies an environment with a user and one or more other computing devices;
determining, in response to the user input, whether an additional computing device of the one or more other computing device could more effectively perform the operation than the robotic computing device because of a location of the additional computing device; and
when the robotic computing device determines that the additional computing device can more effectively perform the operation because of the location of the additional computing device:
providing a robotic input from the robotic computing device to the additional computing device in furtherance of causing the additional computing device to perform the operation,
wherein the robotic input causes the additional computing device to initialize performance of the operation and fulfill the request embodied in the user input,
wherein determining that the additional computing device can more effectively perform the operation includes:
determining that the location of the additional computing device is closer to an additional user in the environment than the robotic computing device,
wherein fulfilling the request involves communicating with the additional user.

10. The method of claim 9, wherein providing the robotic input from the robotic computing device to the additional computing device in furtherance of causing the additional computing device to perform the operation includes:
rendering, at the robotic computing device, an audible output that embodies natural language content that directs the additional computing device to perform the operation.

11. The method of claim 10, wherein the additional computing device provides access to an automated assistant, and the natural language content includes an invocation phrase that invokes the automated assistant.

12. The method of claim 10, wherein the operation involves broadcasting a message to an additional user, and the natural language content characterizes the message to be broadcast by the additional computing device for the additional user.

13. A system comprising:
memory storing instructions; and
one or more processors operable to execute the instructions to:
receive a user input that embodies a request for a robotic computing device to facilitate performance of an operation,
wherein the robotic computing device occupies an environment with the user and one or more other computing devices;
determine, in response to the user input, whether an additional computing device of the one or more other computing devices is exhibiting a state that is more suitable, relative to a current state of the robotic computing device, for initializing performance of the operation,
wherein the determination is based on the additional computing device being plugged into a utility power source, and the current state of the robotic computing device being a battery powered state; and
when the additional computing device of the one or more other computing devices is determined to exhibit the state that is more suitable for initializing performance of the operation:
cause the robotic computing device to provide a robotic input as input to the additional computing device,
wherein the robotic input includes content that solicits the additional computing device to initialize performance of the operation, and
wherein providing the robotic input causes the additional computing device to initialize performance of the operation based on the robotic input.

14. The system of claim 13, wherein the additional computing device of the one or more other computing devices is determined to exhibit the state that is more suitable for initializing performance of the operation based on the additional computing device exhibiting a greater signal strength than a signal strength exhibited by the robotic computing device in the current state.

15. The system of claim 13, wherein the additional computing device of the one or more other computing devices is determined to exhibit the state that is more suitable for initializing performance of the operation based on the additional computing device exhibiting a greater processing bandwidth than a processing bandwidth exhibited by the robotic computing device in the current state.

16. The system of claim 13, wherein one or more of the processors are further operable to execute the instructions to:
    when the additional computing device of the one or more other computing devices is determined to not exhibit the state that is more suitable for initializing performance of the operation:
        cause the robotic computing device to initialize performance of the operation.

17. The system of claim 13, wherein in causing the robotic computing device to provide the robotic input as input to the additional computing device, one or more of the processors are to:
    cause the robotic computing device to render an audio output via an audio interface of the robotic computing device.

\* \* \* \* \*